Feb. 3, 1970 D. S. IRONSIDE ET AL 3,493,948
TAPE LOOP STORAGE DEVICE
Filed Jan. 21, 1966

*INVENTORS*
DONALD S. IRONSIDE
*BY* JAMES E. PALMER
Francis J. Thomas
ATTORNEY

United States Patent Office 3,493,948
Patented Feb. 3, 1970

3,493,948

TAPE LOOP STORAGE DEVICE

Donald S. Ironside, King of Prussia, Pa., and James E. Palmer, Moorestown, N.J., assignors, by mesne assignments, to DASA Corporation, Andover, Mass., a corporation of Massachusetts Filed Jan. 21, 1966, Ser. No. 522,303
Int. Cl. G11b *5/00*
U.S. Cl. 340—174.1 7 Claims

ABSTRACT OF THE DISCLOSURE

A storage device for flexible tape, having means for forming the tape entering the storage compartment into long loops to thereby more efficiently utilize the storage space.

This invention relates to a storage device for flexible media and, in particular, to a device for efficiently storing a tape in a configuration of loops in a relatively small storage area.

A storage apparatus using flexible tape is shown and described in U.S. Patent No. 3,393,277 issued on July 16, 1968 to James E. Palmer and David L. Nettleton. In the present invention, a magnetic tape is stored on an edge in a configuration of loops within a tape storage area. The amount of space required to store the tape is dependent upon several factors including the average size of the loops in the storage area where a configuration of long loops requires less storage area than is required when the tape assumes short loops.

In the present invention, a device of the type described in the reference patent application is modified by the addition of a device which causes the tape to form long loops as it enters the storage area. This is accomplished by feeding the tape into the storage area adjacent to the moving endless belt. The previously-stored tape loops force the entering tape into frictional contact with the moving belt which urges the entering tape into relatively long loops. The moving belt also aids in distributing the tape throughout the storage area by forcing the tape to the rear of the storage area.

The preferred embodiment of the invention is described in conjunction with magnetic tape but, the invention is also suitable for use with other flexible media, such as paper tape and film, regardless of the function performed by the media.

It is thus an object of the present invention to provide an improved storage device for flexible media.

Another object is to provide an improved storage device for tape wherein the tape is stored on an edge with a configuration of relatively long loops.

A further object is to provide an improved storage device for tape wherein a moving endless belt causes the tape to form long loops.

A still further object is to provide an improved data storage device employing data accessing apparatus in conjunction with data bearing tape, wherein the tape is stored on an edge with a configuration of relatively long loops.

The foregoing and other objects, features and advantages of the invention will be apparent from the following more particular description of a preferred embodiment of the invention, as illustrated in the accompanying drawings.

Figure 1:
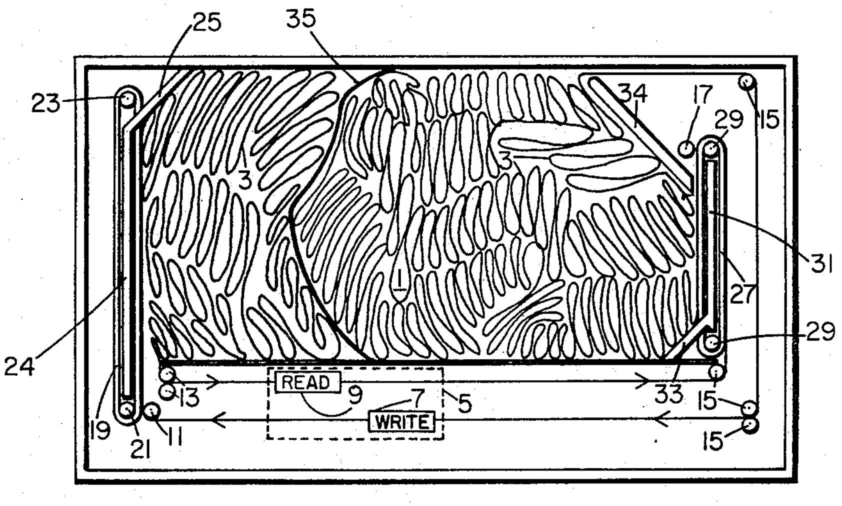
FIG. 1 is a functional diagram of the preferred embodiment of the invention.

As shown in FIG. 1, a storage area or chamber 1 contains loops of tape 3. While only a few loops of tape are shown in the storage area in order to simplify the drawings, in practice many loops are densely packed in the area. In the preferred embodiment of the invention, a continuous magnetic tape is employed and two separate portions of the tape are simultaneously stored in opposite end or compartments of the storage area. A data accessing station 5 contains a "write" element 7 for entering data on the tape and a "read" element 9 for sensing previously-written data. These elements 7, 9 contain transducers and associated components, and can be of the type described in the reference patent application.

Magnetic tape that has left the write element 7 passes a roller 11 to form a storage loop within the left side of the storage area 1. The tape is subsequently removed from the storage loop through capstans 13 to the read element 9 to permit the written data to be sensed at the desired time. The remainder of the tape 3 is stored in a reserve loop in the right side of the storage area through the action of several capstans and rollers 15, 17.

A rubber belt 19 is located at the entrance to the storage loop. This belt continuously rotates in a counterclockwise direction around two pulleys 21, 23. Tape that has passed the write element 7 is brought into frictional contact with belt 19 by roller 11. The tape loops that have previously been formed in the storage area maintain the entering tape against the belt, especially when a large number of loops are stored. In this manner, the entering tape is urged by the belt toward the rear of the storage area, forming relatively long loops. The entering tape also acts as a wedge, forcing the stored tape loops near the rear of the storage compartment away from the belt. The belt 19 is narrower than the tape 3 so that the belt contacts the tape in a region which does no contain stored data to prevent wear on the data-storage region. A backing plate 24 supports that portion of the tape that is out of contact with the belt. A deflector 25 urges the tape away from the belt in the vicinity of pulley 23 to prevent the tape from being attracted around this pulley. The backing plate 24 and deflector 25 are described in greater detail with respect to FIG. 2.

In a similar manner, the reserve tape that has passed the read element 9 is formed in long loops by a belt 27 that rotates around two pulleys 29. A backing plate 31 and a deflector 33 serve the same function as the previously-described plate 24 and deflector 25. Tape entering the reserve loop is brought around the belt mechanism and enters the storage area from the rear so that the belt urges the entering tape into loops away from the tape which is to leave the reserve loop. The simpler feed mechanism that is used for the storage (left) loop is not used for the reserve (right) loop to avoid a crossover of the tape entering and leaving the reserve loop. An additional deflector 34 prevents the stored loops from entering the feed mechanism under the attraction of the exiting tape.

A flexible ribbon 35 has its ends affixed to walls of the storage area. The ribbon separates the storage (left) loop from the reserve (right) loop. The primary purpose of the ribbon is to reduce the drag caused by static charges on the tape. This is accomplished by using a ribbon with low static attraction properties and a low coefficient of friction with the tape. Suitable ribbon materials are woven nylon or rayon. Since the ribbon separates the storage loop from the reserve loop, each loop is prevented from entering the feed mechanism associated with the other loop. Since the ribbon flexes to conform with tape pressure, the capacity of the storage area is not substantially reduced.

Figure 2:
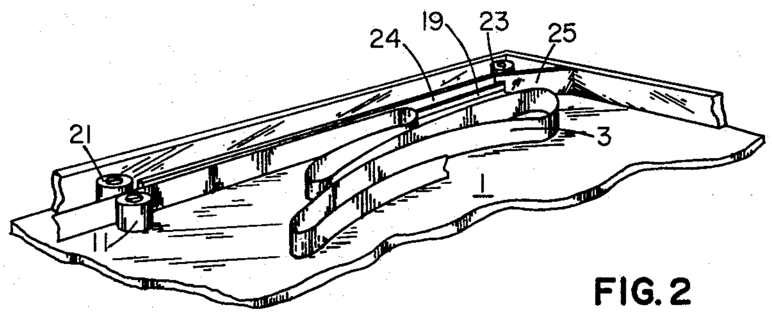
FIG. 2 is a perspective view of a tape transport portion of the preferred embodiment of the invention.

The loop forming apparatus is shown in greater detail in FIG. 2. The belt 19 is driven by pulleys 21 and 23 as described above. The pulleys contain a crown (not shown) at their lower portions to maintain the belt near the floor of the storage area 1. The back plate 24 and the deflector 25 are shown to be of unitary construction with an opening in the deflector portion for the belt 19.

The tape feed components (capstans, drive motors, pulleys, etc.) are not shown in detail because numerous suitable components are well known. Referring to FIG. 1, the belts 19 and 27 are continuously driven by motive means (not shown) connected to either associated pulley. Roller 11 is slidably arranged to bring the tape into frictional contact with belt 19 and pulley 21 to cause the tape to move past the write element 7 during a write operation. Similarly, roller 17 is arranged to bring the tape into contact with belt 27 and pulley 29 to cause the tape to move past the read element 9 during a read operation. Obviously more sophisticated tape feed mechanisms can be employed if desired.

Although the preferred embodiment of the invention employs separate write and read elements 7 and 9 in conjunction with a storage loop and a reserve loop, the invention can be practiced with a single transducer for both writing and reading and a single storage loop. Furthermore, the inventive principles are not only applicable to a horizontal storage area, as shown, but may be employed with a vertical storage area.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A storage device for flexible tape comprising, in combination:
   a horizontal storage chamber adapted to store said tape on edge, said storage chamber being divided into two adjacent coplanar compartments of varying but complementary volumes, both compartments being substantially filled with tape at all times;
   and means adapted to form said tape entering the storage chamber into a configuration of long loops, said long loop forming means including an endless belt mounted in one side of each coplanar compartment adapted to carry said tape into said compartment to a restricted area wherein said tape flexes and forms the desired loops.

2. The storage device described in claim 1 wherein:
   said tape being urged into contact with said belt by the previously stored tape substantially throughout that portion of the length of said belt which is exposed within said storage chamber.

3. The device described in claim 2 wherein said belts are narrower than said tape and mounted so as to centrally contact said tape thereby avoiding contact with the data storage region of said tape.

4. The device described in claim 2, wherein said endless belts extend rearwardly into said compartments, said long loop forming means further comprising a rigid deflector means adapted to urge said tape away from contact with said belt, said deflector means being located adjacent the rearward extremity of said belts within said compartments.

5. The storage device described in claim 1, wherein:
   said long loop forming means comprises:
   a first endless moving belt adapted to selectively make initial contact with said tape outside the first of said compartments and extending rearwardly to carry said tape into said first compartment, said tape being urged into contact with said first belt by the loops of previously stored tape substantially throughout that portion of the length of said first belt which is exposed within said first compartment;
   a first substantially rigid deflector located adjacent the rearward extremity of said first belt within said first compartment adapted to separate said tape from said first belt;
   a second endless moving belt adapted to selectively make initial contact with said tape outside of the second of said compartments and extending rearwardly to carry said tape into said second compartment, said tape being urged into contact with said second belt by loops of previously stored tape substantially throughout that portion of the length of said second belt which is exposed within said second compartment; and
   a second substantially rigid deflector located adjacent the rearward extremity of said second belt within said second compartment adapted to separate said tape from said second belt.

6. The storage device described in claim 5, wherein:
   said first and second endless belts are continuously moving in their respective preselected directions;
   said storage device further comprising:
   a first laterally movable roller external of said first compartment and around which said tape passes, said first roller being adapted to selectively move said tape into frictional engagement with said belt to move said tape in a first direction into said first compartment; and
   a second laterally movable roller adjacent said second belt external of said second compartment, said second roller being adapted to selectively move toward said second belt to provide frictional contact between said tape and said second belt to move said tape in a second direction into said second compartment.

7. A device adapted to store data on a continuous magnetic tape comprising, in combination:
   horizontal storage means adapted to store tape on an edge in a storage area, and including a flexible member for dividing the storage area into a storage loop region and a reserve loop region, said flexible member being adaptable in position to vary the relative sizes of the regions to conform to the relative amounts of tape stored in each region;
   a write element adaped to enter data on a tape;
   a read element adapted to sense data on a tape;
   and a tape feed mechanism adapted to position a continuous tape with a first portion in the reserve region, a second portion contiguous to the first portion in the vicinity of the write element, a third portion contiguous to the second portion in the storage region, and a fourth portion contiguous to the third and first portions in hte vicinity of the read element;
   said tape feed mechanism comprising means adapted to selectively move the tape from the reserve region past the write element and into the storage region, means adapted to selectively move the tape from the storage region past the read element and into the reserve region,
   a first moving belt means to provide a flat moving surface into the storage region and adapted to urge tape entering the storage region to form long loops,
   a second moving belt means to provide a flat moving surface into the reserve region and adapted to urge tape entering the reserve region to form long loops,
   a first deflector arranged in the vicinity of the first moving belt within the storage region and adapted to urge tape away from contact with the first belt, and a second deflector arranged in the vicinity of the second moving belt within the reserve region and adapted to urge tape away from contact with the second belt.

References Cited

UNITED STATES PATENTS

| | | | |
|---|---|---|---|
| 3,114,512 | 12/1963 | Peshel et al. | 179—100.2 |
| 3,410,471 | 11/1968 | Ironside | 226—200 |

| | | | |
|---|---|---|---|
| 2,979,244 | 4/1961 | Pouliart et al. | 179—100.2 |
| 3,041,417 | 6/1962 | Stroud et al. | 179—100.2 |
| 3,169,686 | 2/1965 | Rabinow | 179—100.2 |

BERNARD KONICK, Primary Examiner

W. F. WHITE, Assistant Examiner

U.S. Cl. X.R.

179—100.2; 226—118, 171

PO-1050
(5/69)

UNITED STATES PATENT OFFICE
CERTIFICATE OF CORRECTION

Patent No. 3,493,948 Dated February 3, 1970

Inventor(s) Donald S. Ironside and James E. Palmer

It is certified that error appears in the above-identified patent and that said Letters Patent are hereby corrected as shown below:

Column 2, line 10, "end" should read --ends--; line 14 after "tain" insert --magnetic--. Column 4, line 32, before "belt" insert --first--; line 58, "hte" should read --the--.

SIGNED AND SEALED
AUG 25 1970

(SEAL)
Attest:

Edward M. Fletcher, Jr.
Attesting Officer

WILLIAM E. SCHUYLER, JR.
Commissioner of Patents